Aug. 24, 1954　　　　F. P. HARESLAK　　　　2,687,122
FUEL-LEVEL CONTROL APPARATUS FOR MODEL AIRPLANES
Filed July 18, 1952　　　　　　　　　　　　2 Sheets-Sheet 1
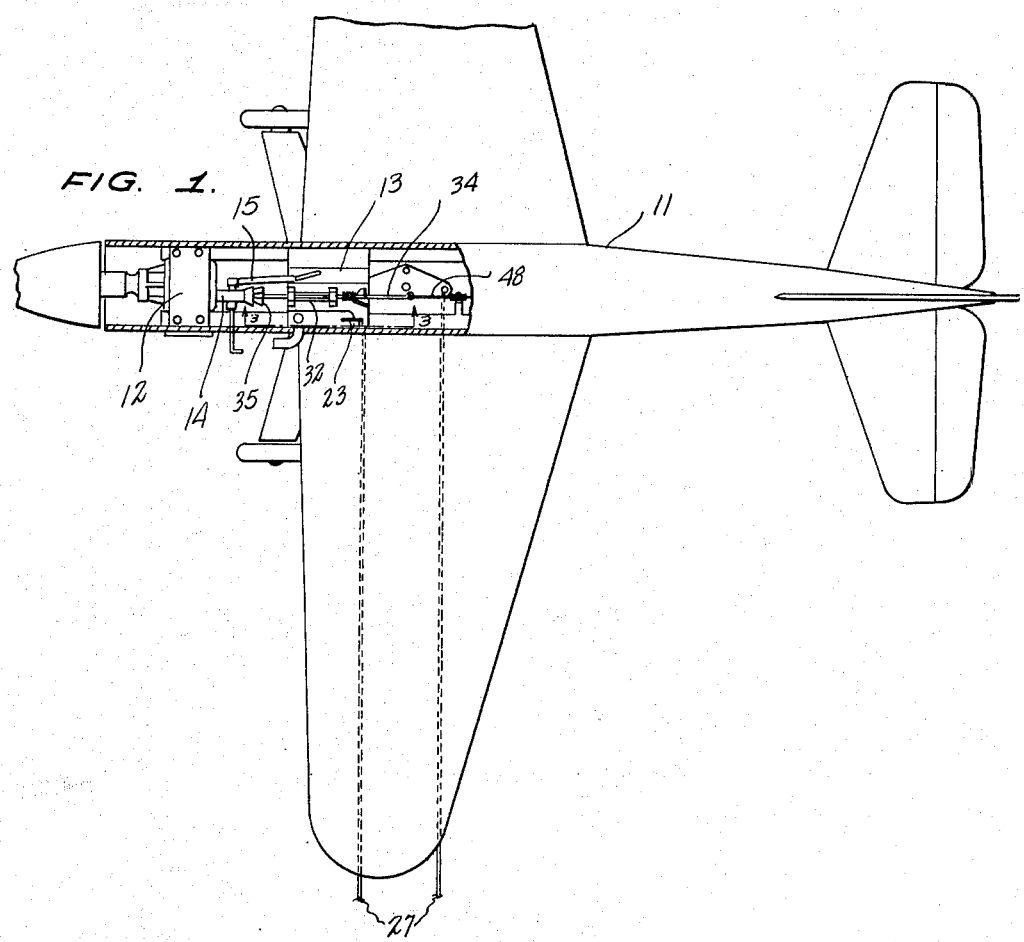
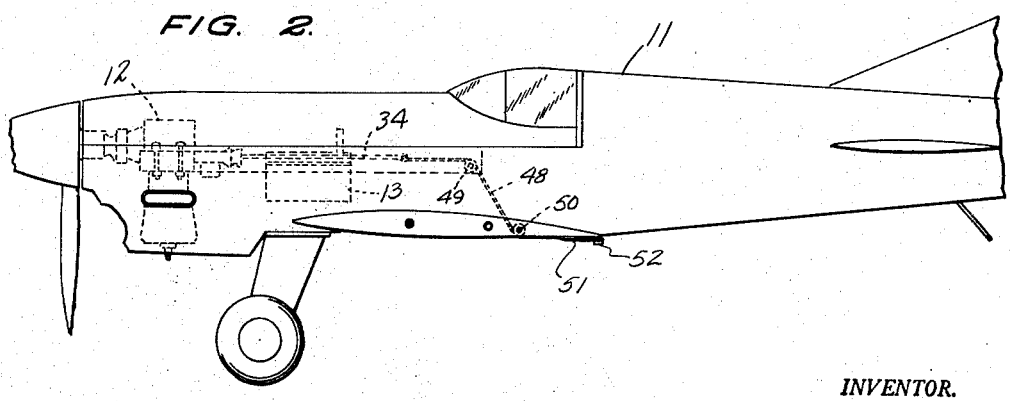
INVENTOR.
FRANCIS P. HARESLAK,
BY
McMorrow, Berman & Davidson
ATTORNEYS.

Aug. 24, 1954 F. P. HARESLAK 2,687,122
FUEL-LEVEL CONTROL APPARATUS FOR MODEL AIRPLANES
Filed July 18, 1952 2 Sheets-Sheet 2
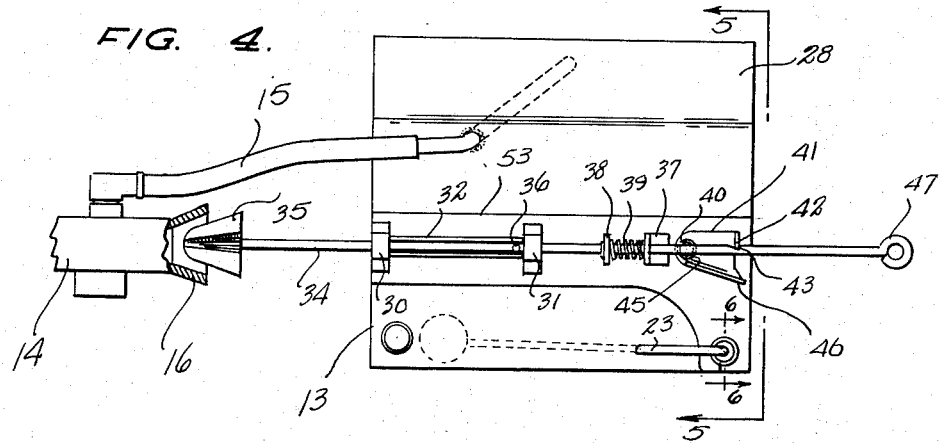
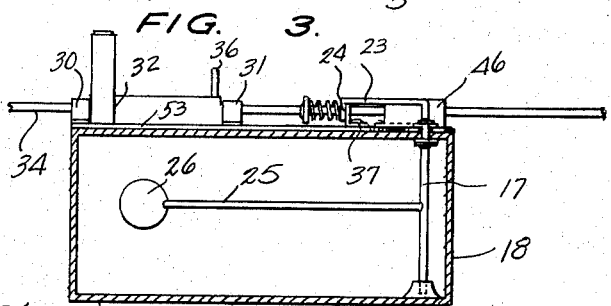
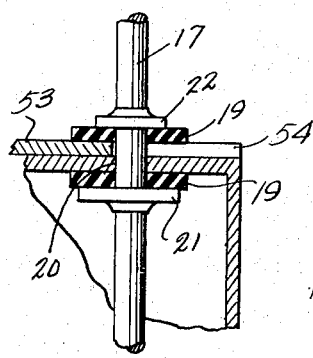
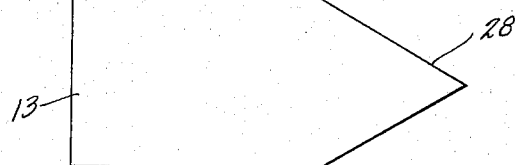
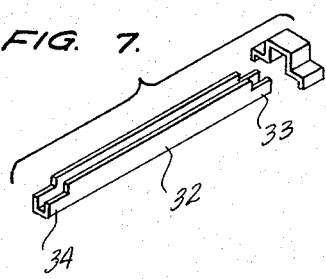
INVENTOR.
FRANCIS P. HARESLAK,
BY
McMorrow, Berman - Davidson
ATTORNEYS Patented Aug. 24, 1954

2,687,122

UNITED STATES PATENT OFFICE 2,687,122

FUEL-LEVEL CONTROL APPARATUS FOR MODEL AIRPLANES

Francis P. Hareslak, Perth Amboy, N. J.

Application July 18, 1952, Serial No. 299,627

2 Claims. (Cl. 123—97)

This invention relates to model airplanes, and more particularly to control means for producing mechanical operations in response to diminution of the fuel supply in the gasoline tank of a model airplane, such as slowing down the engine.

A main object of the invention is to provide a novel and improved fuel-level responsive means for use in a model airplane to produce mechanical results in response to the diminution of the fuel supply in the gasoline tank of the airplane, such as slowing down the engine, or the like, the improved apparatus being simple in construction, being reliable in operation, and being easy to install in a model airplane.

A further object of the invention is to provide an improved fuel-level responsive apparatus for use in a model airplane to perform operations such as slowing down the airplane engine, or the like, when the level of fuel in the gasoline tank of the model engine is reduced to a predetermined value, whereby the airplane's flight may be prolonged or whereby the airplane may be automatically prepared for landing or the like, the improved apparatus involving inexpensive components, being sturdy in construction and being easy to set and reset.

Further objects and advantages of the invention will become apparent from the following description and claims, and from the accompanying drawings, wherein:

Figure 1 is a fragmentary top plan view, partly in cross section, of a model airplane equipped with an improved control apparatus according to the present invention.

Figure 2 is a fragmentary side elevational view of the model airplane of Figure 1.

Figure 3 is an enlarged cross sectional view taken on the line 3—3 of Figure 1.

Figure 4 is a fragmentary top plan view of the gasoline tank of the model airplane of Figures 1 to 3, showing the control apparatus mounted thereon, and showing a portion of the air intake manifold of the internal combustion engine of the airplane, said manifold being shown partly in cross section, and illustrating how the control apparatus cooperates with the air intake manifold.

Figure 5 is a cross sectional view taken on the line 5—5 of Figure 4.

Figure 6 is an enlarged cross sectional detail view taken on the line 6—6 of Figure 4.

Figure 7 is an enlarged perspective detail view of the guide for the slidable valve member of the control apparatus of Figures 1 to 6.

Referring to the drawings, and more particularly to Figures 1 and 2, 11 designates a model airplane powered by an internal combustion engine 12 located in the forward portion of its fuselage and having the conventional fuel tank 13 mounted in the fuselage rearwardly adjacent the engine. Designated at 14 is the fuel intake manifold of the engine, and designated at 15 is the gasoline line connecting the intake manifold 14 to the fuel tank 13. The fuel intake manifold 14 has a flared end 16 which serves as the air intake means, the air being mixed with vapor and gasoline in the intake manifold, in the conventional manner, to provide a proper explosive mixture for ignition in the engine.

Secured on the top wall of the fuel tank is a plate member 53.

Designated at 17 is a shaft member which is rotatably mounted in the fuel tank 13 adjacent the rear end wall 18 of the tank, the upper portion of the shaft 17 extending rotatably through a slot 54 in plate 53 and respective sealing bushings 19, 19 of deformable resilient material provided beneath the aperture 20 in the top wall of the tank and on the plate member 53 and sealingly positioned by respective collar elements 21 and 22 provided on the shaft 17, as shown in Figure 6. The top end of the shaft 17 is formed with the arm 23 which extends substantially at right angles to the main portion of the shaft and is provided at its end with a depending finger element 24. Rigidly secured to the intermediate portion of the shaft 17 inside the tank 13 is the elongated arm 25 having secured to its end a float ball 26. As will be readily understood, the model airplane 11 is connected by a pair of cables 27, 27 to a central point around which the model airplane flies, the airplane flying in a circular path, and the fuel in the gasoline tank being urged outwardly against the tapered wall portion 28 of the tank by centrifugal force, the tank being mounted in a horizontal position in the airplane fuselage. The float ball 26 is also urged against the surface of the fuel by centrifugal force, and the position of said float ball is regulated by the fuel level in the tank. As the fuel level diminishes, the float ball 26 rotates clockwise, as viewed in Figure 4, whereby the top arm 23 of the shaft 17 similarly rotates in a clockwise direction in accordance with the rotation of the float ball 26.

Secured on the plate member 53 are the inverted U-shaped bracket members 30, 31, and secured to said plate member by said brackets is the channel-shaped guide member 32, said channel-shaped guide member having the reduced end portions 33 and 34 respectively received under the bracket members 31 and 30 and secured thereby to the plate member 53 on the fuel tank. Slidably mounted in the guide member 32 and extending beneath the brackets 30 and 31 is the elongated rigid rod 34 having secured to its forward end the fluted, generally conical valve element 35, which is aligned with the intake manifold. As shown in Figure 4, the tapered valve element 35 is arranged for movement inwardly and outwardly with respect to the flared end 16 of the intake manifold 14 as the rod 34 moves longitudinally in the guide member 32. A vertically projecting stop pin 36 is secured on the rod 34 between the brackets 30 and 31 to limit rearward movement of the rod member 34 by the engagement of the pin 36 with the bracket 31. Secured to the plate member 53 rearwardly of the bracket 31 is the angle bracket 37 through which the rod 34 slidably extends, said rod being formed forwardly of the bracket 37 with a collar 38. Surrounding the rod between the collar 38 and the bracket 37 is a coil spring 39 which acts on the collar 38 to bias the rod 34 forwardly, urging the valve element 35 into the flared end 16 of the manifold 14. Pivoted at 40 to the plate member 53, rearwardly of the angle bracket 37 is an arm 41 formed with a spur 42 engageable in a notch 43 formed in the rod 34, to lock the rod 34 in retracted position, as shown in Figure 4, the arm 41 being biased toward this locking position by a relatively weak spring 45 secured to the plate member 53 at the connection 40 and having a spring arm engaging an upstanding marginal flange 46 formed on the arm 41 on the side thereof opposite the spur element 42. It will be apparent from Figure 4 that the arm 23 on the top end of shaft 17 is arranged so that its depending finger element 24 may cammingly engage the upstanding marginal flange 46 of arm 41 when the arm 23 has rotated clockwise responsive to the diminution of the fuel in tank 13 to a relatively low level. When the level of fuel diminishes sufficiently, the depending finger element 24 exerts a sufficient lateral force on the flange 46 to disengage the spur 42 from the detent recess 43, releasing the rod 34, and allowing the coil spring 39 to expand and to move the valve element 35 into the flared end 16 of the intake manifold 14. This reduces the amount of air available for mixing with the gasoline in the intake manifold 14, and consequently causes the engine 12 to slow down.

The rear end of the rod 34 is formed with the ring-shaped eye 47 to which is secured the end of a flexible wire or cable 48, said cable engaging around suitable pulleys 49 and 50 and being connected to a rubber strip 51 secured at 52 to the bottom of the fuselage of the airplane. The apparatus may be reset from the exterior of the airplane by pulling the cable 48 to retract the rod 34 sufficiently to allow the spur 42 on arm 41 to lockingly engage in the notch 43 on the rod 34. The cable 48 is preferably a flexible wire or string, to allow the rod 34 to move forwardly when the spur 42 is disengaged from the slot 43 as a result of diminution of the fuel supply in the gasoline tank 13.

While a specific embodiment of an improved automatic control means responsive to the diminution of the fuel level in a model airplane gasoline tank has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a model airplane, an internal combustion engine having an air intake manifold, a fuel tank, a movable float member in said tank controlled by the amount of fuel in the tank, a valve member in axial alignment with the open end of said intake manifold and movable into said manifold open end in response to movement of said float member to a predetermined position in said fuel tank, spring means biasing said valve member toward closing position relative to said open end, releasable holding means restraining said valve member, and means controlled by said float member for disengaging said holding means from the valve member upon movement of said float member to such predetermined position in said fuel tank.

2. In a model airplane, an internal combustion engine having an air intake manifold, a fuel tank, a movable float member in said tank controlled by the amount of fuel in the tank, a valve member slidably mounted on said tank in axial alignment with the open end of said intake manifold and being arranged for movement into said open end to limit air intake into said manifold, spring means urging said valve member into said open end, a detent member pivoted to said tank and being lockingly engageable with said valve member, a shaft pivoted in said tank, means connecting said float member to said shaft, and an arm on the end of said shaft engageable with said detent member and arranged to disengage said detent member from the valve member when the float member moves to a predetermined position in said fuel tank.

References Cited in the file of this patent
UNITED STATES PATENTS

| Number | Name | Date |
|---|---|---|
| 1,338,104 | Shurtleff | Apr. 27, 1920 |
| 1,812,012 | Muzzy | June 30, 1931 |
| 2,023,936 | Rolfe | Dec. 10, 1935 |
| 2,569,377 | Hans | Sept. 25, 1951 |
| 2,601,894 | Morse | July 1, 1952 |
| 2,611,351 | Horner | Sept. 23, 1952 |

FOREIGN PATENTS

| Number | Country | Date |
|---|---|---|
| 135,557 | Great Britain | Dec. 4, 1919 |